United States Patent
Kang et al.

(10) Patent No.: US 8,582,045 B2
(45) Date of Patent: Nov. 12, 2013

(54) LIQUID CRYSTAL DISPLAY DEVICE

(75) Inventors: Won-Seok Kang, Seoul (KR); Jong-Beom Lee, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 409 days.

(21) Appl. No.: 12/292,689

(22) Filed: Nov. 24, 2008

(65) Prior Publication Data
US 2009/0262275 A1 Oct. 22, 2009

(30) Foreign Application Priority Data

Apr. 21, 2008 (KR) .................. 10-2008-0036679
Aug. 20, 2008 (KR) .................. 10-2008-0081337

(51) Int. Cl.
*G02F 1/1333* (2006.01)
*G02F 1/1335* (2006.01)

(52) U.S. Cl.
USPC ............................................. 349/58; 349/63

(58) Field of Classification Search
USPC ....................................... 349/58–64
See application file for complete search history.

(56) References Cited

U.S. PATENT DOCUMENTS

| | | | |
|---|---|---|---|
| 6,204,896 B1 * | 3/2001 | Matsuhira et al. ............... | 349/12 |
| 6,414,781 B1 * | 7/2002 | Saitoh ............................ | 359/245 |
| 2002/0003589 A1 * | 1/2002 | Watanabe et al. ............... | 349/43 |
| 2006/0139574 A1 * | 6/2006 | Ralli et al. ...................... | 353/20 |
| 2006/0158591 A1 * | 7/2006 | Trapani et al. ................. | 349/119 |
| 2007/0065091 A1 * | 3/2007 | Hinata et al. ................... | 385/147 |
| 2007/0183149 A1 * | 8/2007 | Ko et al. ........................ | 362/225 |
| 2007/0258137 A1 | 11/2007 | Kamijima | |
| 2007/0258138 A1 * | 11/2007 | Cowan et al. ................. | 359/443 |
| 2007/0263145 A1 * | 11/2007 | Ishikawa et al. .............. | 349/114 |
| 2008/0007675 A1 * | 1/2008 | Sanelle et al. ................. | 349/96 |

FOREIGN PATENT DOCUMENTS

| | | |
|---|---|---|
| JP | 0393365 A | 4/1991 |
| JP | 7-29530 U | 6/1995 |
| JP | 10-239693 A | 9/1998 |
| JP | 11142603 A | 5/1999 |
| JP | 2000347168 A | 12/2000 |
| JP | 2001-93365 A | 4/2001 |
| JP | 2001-133765 A | 5/2001 |

(Continued)

OTHER PUBLICATIONS

"Improvement of Light Leak for LCD Design," International Business Machines Corporation, Research Disclosure, Mason Publications, Hampshire, G.B., vol. 420, No. 100, Apr. 1, 1999.

(Continued)

*Primary Examiner* — Bumsuk Won
*Assistant Examiner* — Charles Chang
(74) *Attorney, Agent, or Firm* — Morgan, Lewis & Bockius LLP (57) ABSTRACT

Disclosed is a liquid crystal display (LCD) device having a protection member capable of enhancing reliability against an external impact, and an outdoor visibility against an external light. The LCD device comprises: an LC panel for displaying images; a backlight unit disposed below the LC panel, and providing light; a protection member provided on the LC panel, and consisting of a tempered substrate for protecting the LC panel from an external impact, and an anti-reflect layer formed on the tempered substrate and reducing a reflectivity of external light; and an adhesive layer formed of a material having a similar refractivity to the LC panel and the tempered substrate of the protection member, for adhering the protection member onto the LC panel by being interposed therebetween.

9 Claims, 5 Drawing Sheets

(56) References Cited

FOREIGN PATENT DOCUMENTS

| JP | 2005055641 A | 3/2005 |
| JP | 2005-181939 A | 7/2005 |
| TW | 200745591 A | 12/2007 |
| WO | WO 02/061721 A2 | 8/2002 |
| WO | WO 2007/066590 A1 | 6/2007 |

OTHER PUBLICATIONS

JP Office Action issued Apr. 2, 2013.

* cited by examiner

LIQUID CRYSTAL DISPLAY DEVICE

RELATED APPLICATION

The present invention relates to subject matter contained in priority Korean Application No. 10-2008-0036679, filed on Apr. 21, 2008 and 10-2008-0081337, filed on Aug. 20, 2008, which are herein expressly incorporated by reference in their entirety.

BACKGROUND OF THE INVENTION

1. Field of the Invention

The present invention relates to a liquid crystal display (LCD) device, and more particularly, to an LCD device having a protection member capable of enhancing reliability against an external impact and preventing outdoor visibility from being lowered due to an external light.

2. Description of the Background Art

Generally, a cathode ray tube (CRT), one of most widely used display devices is mainly applied to a television, monitors of meters, information terminal devices, etc. However, the CRT may cause problems in implementing a compact and light-weighted configuration of electronic devices due to its weight and size.

In order to replace these problems of the CRT, liquid crystal display (LCD) devices having advantages such as a small size, a light weight, and a low consumption power have been actively developed. Recently, demands for flat display devices such as a notebook, a desk top, a large monitor having 30 or more inches, and a wall-mounted TV increase.

The LCD device serves to display images by controlling an amount of light provided from outside. The LCD device is provided with a backlight unit including an additional optical source for irradiating light to an LCD panel. The LCD device is largely divided into an edge type and a direct type according to the position of an optical source with respect to a display surface of the LCD panel. The direct type backlight unit is being widely applied to an LCD device having 30 or more inches, due to its high optical utility, a characteristic to be easily treated, and no limitation in size of the display surface.

However, the direct type backlight unit has the following problems. When a plurality of cold cathode fluorescent lamps (CCFLs) are driven in parallel using one transformer, only some of the CCFLs are driven due to discharge characteristics of the CCFLs. More concretely, the CCFLs have an infinite resistance before being discharged, while having a small resistance due to conductive plasmas occurring in a glass tube after being discharged. Accordingly, once the CCFLs are discharged, an amount of current is increased due to a decreased resistance. That is, when a plurality of CCFLs are driven in parallel, a current flows to CCFLs having a small resistance after being discharged. Accordingly, some of the CCFLs are driven, but others thereof are not driven.

In order to solve these problems, a lamp driving device has been proposed for an LCD device capable of driving a plurality of CCFLs in parallel with using one transformer. According to the lamp driving device, the same equivalent circuit as an external electrode fluorescent lamp (EEFL) is configured by attaching a capacitor having the same capacity (ballast capacitor) onto two electrodes of each CCFL.

Here, the EEFL is lightened by applying an alternate current (AC) to external electrodes. That is, discharge occurs at a discharge space inside a glass tube by an electric field due to a high frequency voltage applied to one pair of external electrodes, thereby emitting ultraviolet rays. Due to the ultraviolet rays, a fluorescent substance deposited onto an inner circumferential surface of the glass tube emits light, thereby emitting visible rays.

Figure 1:
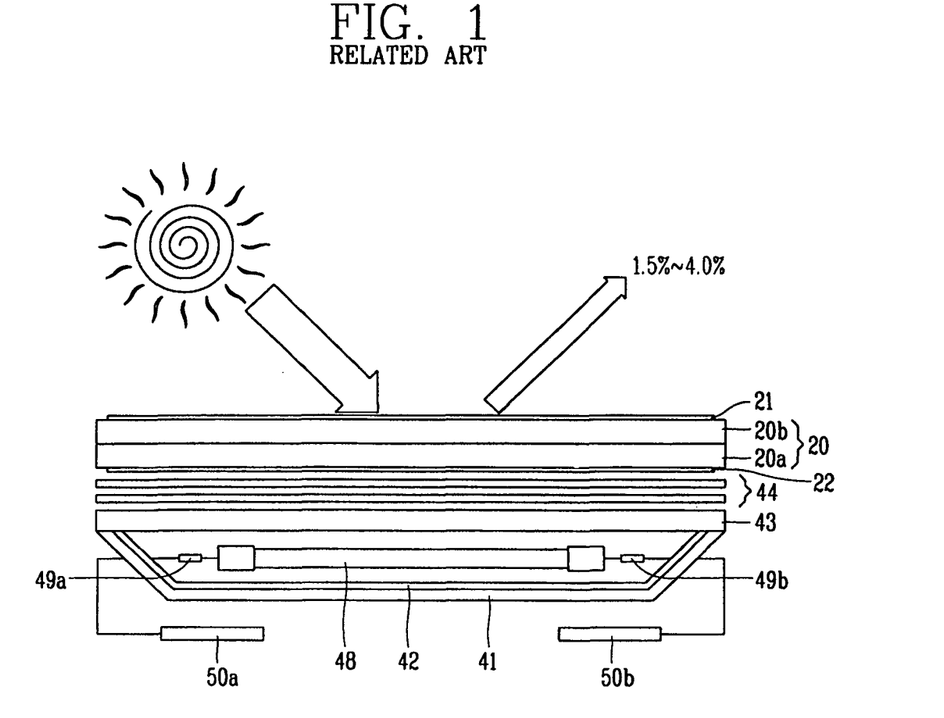
FIG. 1 is a sectional view of a direct type liquid crystal display (LCD) device in accordance with the conventional art.

FIG. 1 is a sectional view of a direct type LCD device in accordance with the conventional art.

As shown in FIG. 1, the direct type LCD device comprises a backlight unit for providing light; an LC panel 20 disposed above the back light unit and receiving light; polarizers 21 and 22 (or polarizing films) disposed at both side surfaces of the LC panel 20; etc. Here, the backlight unit includes lamps 48 serving as an optical source.

A reflection plate 42 for reflecting light provided from the lamps 48 to a front surface of the LCD device is attached onto a lower cover 41.

Balance PCBs 49*a* and 49*b* for coupling the plurality of lamps 48 are provided at both sides of the lower cover 41. Inverter PCBs 50*a* and 50*b* for applying an AC voltage are connected to the balance PCBs 49*a* and 49*bm*, respectively, which will be explained later.

On the lamps 48, laminated are a diffusion plate 43 for uniformly diffusing light supplied from the lamps 48 and reflected through the reflection plate 42 towards a front surface of the LCD device; and an optical sheet 44 including a prism sheet and/or a protection sheet for compensating an optical function of light that has passed through the diffusion plate 43.

A main support (not shown) for maintaining a balance of an entire force applied to the LCD device is provided. With consideration of the LC panel 20 deposited thereon, the main support is formed to have a certain pattern of steps on an upper side surface thereof.

The LC panel 20 deposited on the main support undergoes a plurality of unit processes. That is, the LC panel 20 includes a thin film transistor (TFT) array substrate 20*a* having a TFT at each unit pixel, a color filter substrate 20*b* having a color filter for displaying colors, and an LC injected between the two substrates.

Polarizers 21 and 22 are attached to both side surfaces of the LC panel 20. The polarizers 21 and 22 serve to transmit light vibrating in the same direction as a polarizing shaft among light provided from the backlight unit, while forming light vibrating in one specific direction by absorbing or reflecting light vibrating in other directions with using a proper medium. The polarizers 21 and 22 are essential components of a TN-mode LCD.

An upper cover (not shown) covers an outer edge of the LC panel 20 having the polarizers 21 and 22 attached thereto, and a side surface of the main support. The upper cover is coupled to the lower cover 41 by an additional coupling means such as hooks.

Figure 2:
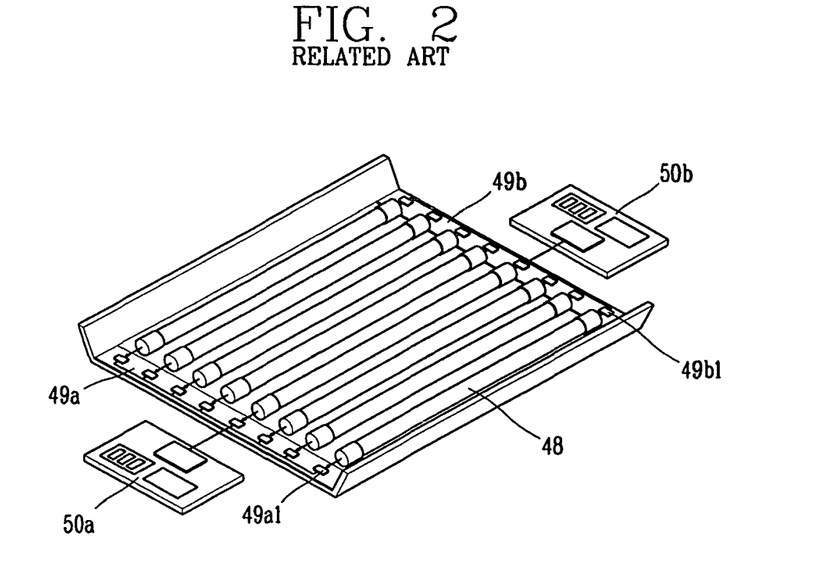
FIG. 2 is a perspective view of a backlight in accordance with the conventional art.

FIG. 2 is a perspective view of a backlight unit in accordance with the conventional art, which shows balance PCBs on the lower cover, and inverter PCBs interworking with the balance PCBs.

As shown in FIG. 2, the inverter PCBs 50*a* and 50*b* converts a DC power provided from outside into an AC high voltage. Then, the AC high voltage is applied to balance PCBs 49*a* and 49*b* through output connectors of the inverter PCBs 50*a* and 50*b* under control of an integrated circuit.

Then, the AC high voltage applied to the balance PCBs 49*a* and 49*b* is supplied to ballast capacitors 49*a*1 and 49*b*1 through conductive wires and high voltage supply patterns (or wires), thereby making the amount of currents introduced into each tube of the lamps 48 the same. Then, the AC high voltage is introduced into the lamps 48 corresponding to the ballast capacitors 49*a*1 and 49*b*1, respectively.

However, the conventional LCD device may have the following problems. When disposed at a public spot such as an airport or a bus terminal, the LCD device may be damaged due to an external impact, etc., or may have scratches by a malicious user on a thin polarizer attached onto an outer surface of an LC panel with a surface hardness of 3H or less than. In order to solve these problems, additional costs are required, which may degrade the reliability of product.

Furthermore, when the LCD device is disposed under a high level of illumination such as external sunlight or an indoor lamp, if a polarizer attached onto an outer surface of the LC panel does not undergo an additional interface process, a reflectivity of light reflected through the polarizer is 4% to the maximum. When the polarizer attached onto the outer surface of the LC panel undergoes an additional interface process, a reflectivity of light reflected through the polarizer is 1.5% to the minimum. As a result, a contrast ratio of the LCD device is decreased due to its surface reflection. Furthermore, an outdoor visibility of the LCD device is considerably decreased due to a discoloration phenomenon, etc.

SUMMARY OF THE INVENTION

Therefore, it is an object of the present invention to provide a liquid crystal display (LCD) device having a protection member capable of protecting an LC panel from an external impact, and capable of enhancing an outdoor visibility.

The LCD device having a protection member may have a light leakage phenomenon that light provided from a backlight disposed below the LC panel at an edge of the protection member leaks.

Therefore, it is another object of the present invention to provide a liquid crystal display (LCD) device having a protection member, in which a light leakage preventing unit is additionally formed at one or more edge regions of the protection member.

To achieve these and other advantages and in accordance with the purpose of the present invention, as embodied and broadly described herein, there is provided a liquid crystal display (LCD) device, comprising: an LC panel for displaying images; a backlight unit disposed below the LC panel, and providing light; a protection member provided on the LC panel, and consisting of a tempered substrate for protecting the LC panel from an external impact, and an anti-reflect layer formed on the tempered substrate and reducing a reflectivity of external light; and an adhesive layer formed of a material having a similar refractivity to the LC panel and the tempered substrate of the protection member, for adhering the protection member onto the LC panel by being interposed therebetween.

The LCD device further comprises a light leakage preventing unit formed at one or more edge regions of the protection member, and preventing leakage of light provided from the backlight unit.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

Hereinafter, a liquid crystal display (LCD) device according to the present invention will be explained in more detail with reference to the attached drawings.

Figure 3:
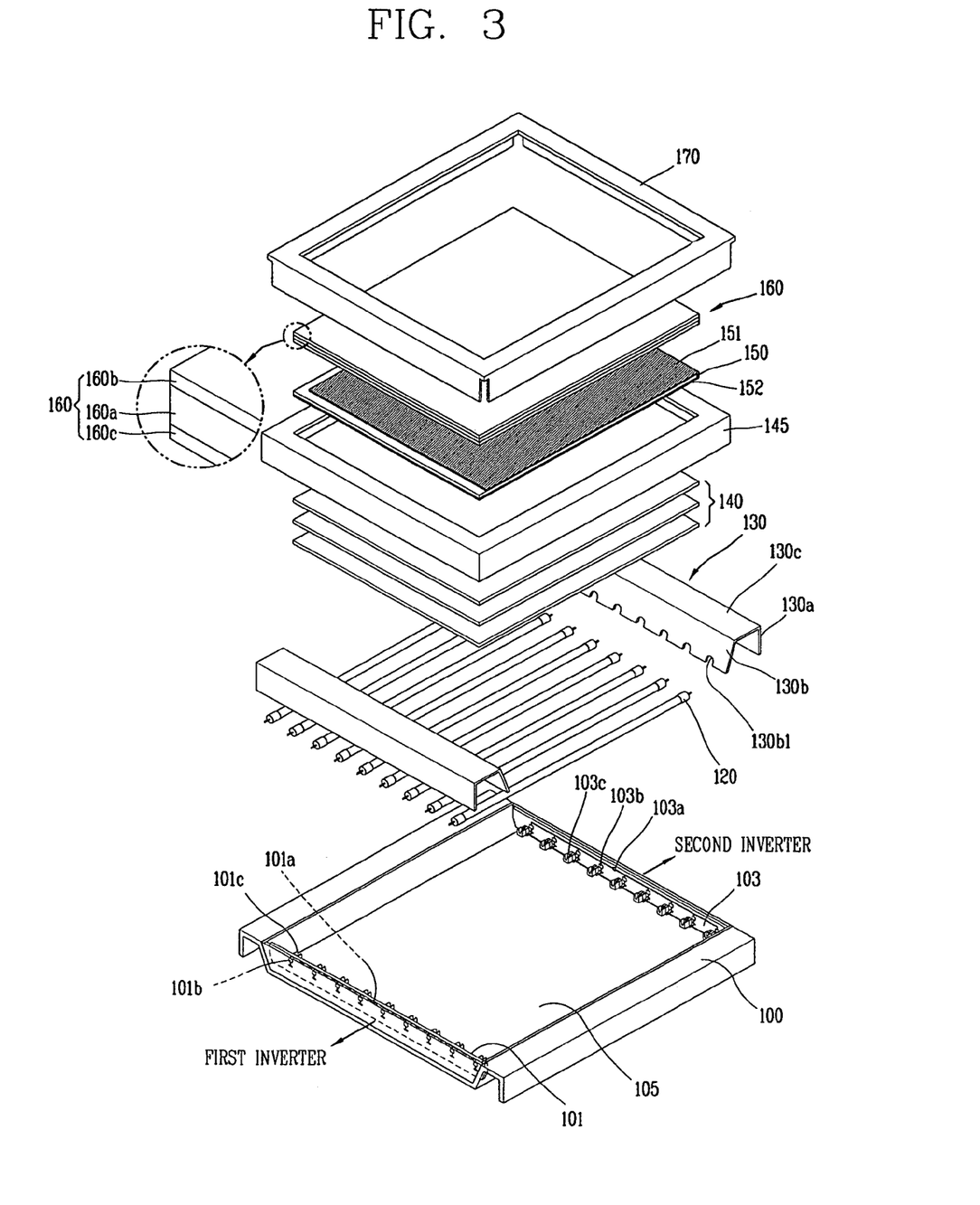
FIG. 3 is an exploded perspective view of an LCD device according to a first embodiment of the present invention.
Figure 4:
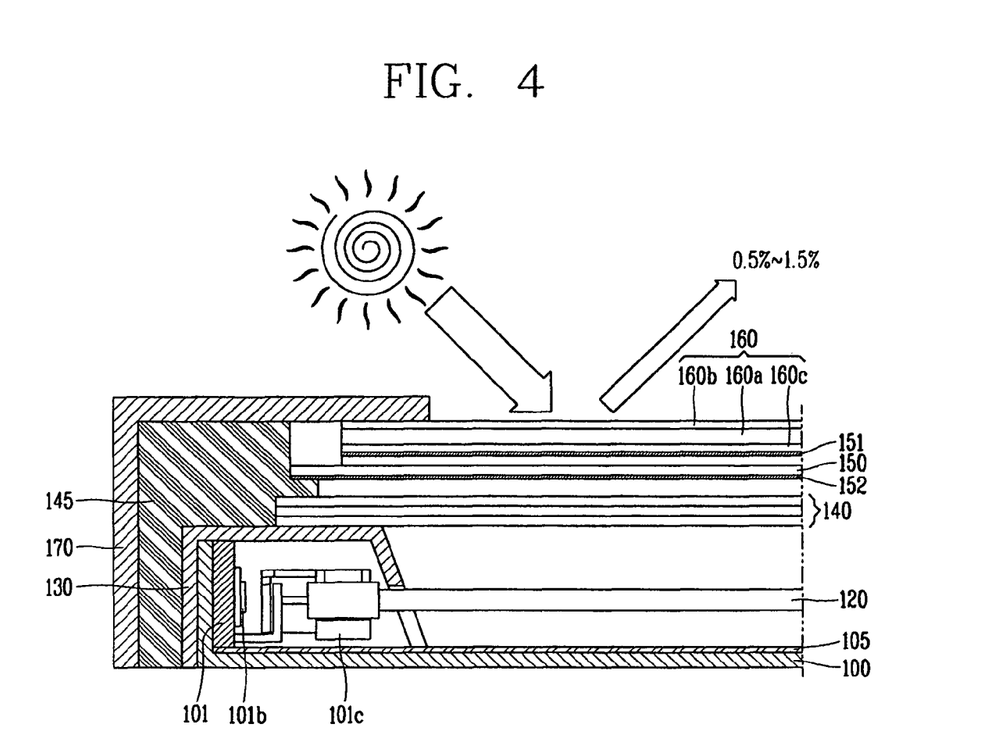
FIG. 4 is a partial sectional view showing a coupled state of the LCD device of FIG. 3.
Figure 5:
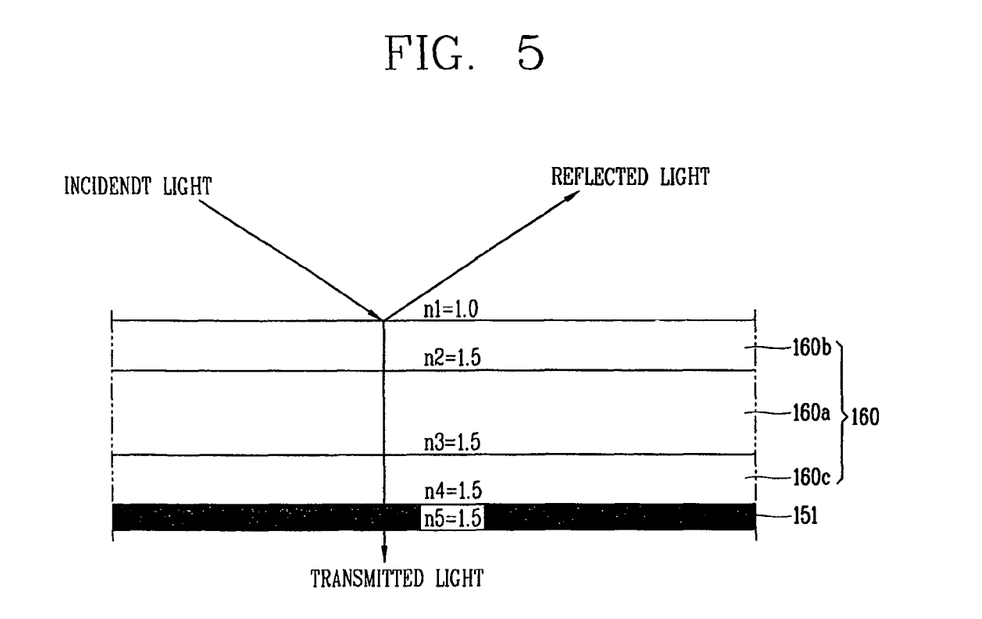
FIG. 5 is a view showing a refractivity of a protection member of FIGS. 3 and 4.

FIG. 3 is an exploded perspective view of an LCD device according to a first embodiment of the present invention, FIG. 4 is a partial sectional view showing a coupled state of the LCD device of FIG. 3, and FIG. 5 is a view showing a refractivity of a protection member of FIGS. 3 and 4.

Referring to FIGS. 3 to 5, the a liquid crystal display (LCD) device according to a first embodiment of the present invention comprises: a backlight unit (not shown) for providing light by receiving a voltage from outside; an LC panel 150 disposed above the backlight unit, and displaying images; and a protection member 160 consisting of a tempered substrate 160a formed on the LC panel 150 and protecting the LC panel 150 from an external impact, and an anti-reflect layer 160b formed on the tempered substrate 160a and reducing a reflectivity of external light, wherein the protection member 160 includes an adhesive layer 160c formed of a material having a similar refractivity to the tempered substrate 160a of the protection member 160, and adhering the protection member 160 onto the LC panel 150 by being interposed therebetween.

At two side walls (or additional fixing means) of a lower cover 100 formed of iron or Electrolytic Galvanized Iron (EGI), balance PCBs 101 and 103 for driving lamps 120 by receiving an AC high voltage from external first and second inverters are vertically provided.

More concretely, the balance PCBs 101 and 103 consist of connectors 101a and 103a for receiving an AC high voltage from external first and second inverters; ballast capacitors 101b and 103b having patterns to stably supply a ballast current to the lamps 120 by receiving the AC high voltage; and lamp sockets 101c and 103c having conductivity so that a ballast current can be stably supplied to the lamps 120, and each having its own angle of about 90° so as to easily couple the plurality of lamps 120.

A reflection plate 105 is attached onto the lower cover 100 at a central part between the balance PCBs 101 and 103 vertically arranged at both sides. As the reflection plate 105, a white polyester film, or a film coated with metallic materials such as Ag or Al may be used. The reflection plate 105 has a reflectivity for visible rays corresponding to about 90~97%. The thicker the coated film, the higher the reflectivity is.

A plurality of lamps 120 are coupled to lamp sockets 101c and 103c fixed onto the balance PCBs 101 and 103 and bent towards an upper side. Here, the lamps 120 coupled to the lamp sockets 101c and 103c may maintain a constant distance of approximately 5 mm from the reflection plate 105 disposed on a rear surface of the lamps 120. If a distance between the lamps 120 and the reflection plate 105 is more than 5 mm, an optical sheet (not shown) to be coupled to an upper component may have wrinkles due to heat.

In order to control a distance between the lamps 120 and the reflection plate 105, the balance PCBs 101 and 103 vertically disposed at both sides of the lower cover 100 can be controlled, or an own angle of each of the lamp sockets 101c and 103c can be controlled.

In controlling a distance between the lamps 120 and the reflection plate 105 by controlling each own angle of the lamp sockets 101c and 103c, the lamp sockets 101c and 103c may be bent in the form of arbitrary shapes as long as the lamps 120 can be coupled thereto. Representative shapes of the lamp sockets 101c and 103c may include 'L' shape shown in drawing, or 'C' shape or 'V' shape. Here, one end of the lamp sockets 101c and 103c is fixed onto the balance PCBs 101 and 103, and another end thereof serves as a holder for coupling the lamps 120.

As aforementioned, the plurality of lamps 120 are coupled to the 'L'-shaped lamp sockets 101c and 103c fixed onto the balance PCBs 101 and 103 with a constant interval therebetween. In the case of an LCD TV having a large area of 32 inches, approximately 16 lamps are arranged for high brightness. And, in the case of an LCD TV having a large area of 40 inches, approximately 18~20 lamps are arranged. However, this general principle may be differently applied according to each model. Here, the lamps 120 may be one of Cold Cathode Fluorescent Lamp (CCFL), External Electrode Fluorescent Lamp (EEFL), and Hot Cold Fluorescent Lamp (HCFL).

On the balance PCBs 101 and 103 including the lamp sockets 101c and 103c positioned at both sides, laminated are side supports 130, that is, fixing members for protecting the balance PCBs 101 and 103 from an external impact. Here, frames of the side support 130 fabricated in a pressing manner include an inclined frame 130b inclined by a certain angle and having a half-circle shaped lamp fixing portion 130b1 for fixing the lamps 120 at a contact portion to the lower cover 100; a vertical frame 130a spacing from the inclined frame 130b, and formed in a vertical direction; and an upper frame 130c extending from an upper side of the two frames in a horizontal direction.

Here, the vertical frames 130a of the side supports 130 are coupled to two side walls of the lower cover 100. In order to outwardly protrude the connector 101a to which an AC high voltage is applied from external first and second inverters, it is preferable to form holes at some regions of the vertical frame 130a.

An optical member 140 is disposed on the side support 130 with both sides thereof being supported by the side support 130. The optical member 140 includes a diffusion plate (not shown) for uniformly distributing light directly emitted from the plurality of lamps 120, and light reflected through the reflection plate 105 to an entire surface of the LC panel 150; and an optical sheet (not shown) for providing additional optical characteristics to light passing through the diffusion plate.

A main support 145 is coupled to an upper side of the backlight unit. When an external impact is applied to the LCD device, the main support 145 having the backlight unit therebelow serves to maintain a balance of an entire force applied to the LCD device. Furthermore, by considering that the LC panel 150 is disposed on a front surface (or upper side surface) of the main support 145, the main support 145 has a pattern that a step is formed between inner and outer side surfaces thereof.

The LC panel 150 disposed on the main support 145 undergoes a plurality of unit processes. That is, the LC panel 150 includes an array substrate serving as a switching device, and formed as a thin film transistor is formed at each unit pixel; a color filter substrate having a color filter for displaying colors; and an LC injected between the array substrate and the color filter substrate.

Polarizers 151 and 152 are attached to side surfaces of the LC panel 150. The polarizers 151 and 152 serve to transmit light vibrating in the same direction as a polarizing shaft among light provided from the backlight unit, while forming light vibrating in one specific direction by absorbing or reflecting light vibrating in other directions with using a proper medium.

A protection member 160 for protecting the LC panel 150 from an external impact, and reducing a reflectivity of light incident form outside is provided on the LC panel 150. More concretely, the protection member 160 includes a tempered substrate 160a for protecting the LC panel 150 from an external impact; an anti-reflect layer 160b exposed to outside by being formed on an upper side surface of the tempered substrate 160a, and contacting external light; and an adhesive layer 160c formed on a lower side surface of the tempered substrate 160a, and contacting the LC panel 150 or the polarizer 151 on the LC panel 150.

Here, the tempered substrate 160a may be formed of a tempered glass having a thickness of about 3 mm so that the LC panel 150 therein can be protected from an external impact. The tempered glass is reinforced by compression-deforming a surface of a molded plate glass and tension-deforming inside thereof, in which the molded plate glass is heated to a temperature of 500°~600° C. close to a softening temperature, and then is drastically cooled by a compressed cooling air. The tempered substrate has a bending intensity corresponding to 3~5 times of a general glass, an impact endurance corresponding to 3~8 times of a general glass, and an excellent heat endurance. Since the tempered substrate maintains a balance of an entire force balance therein, even if one side of the tempered substrate is cut off, the entire part is cracked into pieces. Accordingly, it is required to form the tempered substrate in a shape suitable for the purpose before performing a tempered process.

The anti-reflect layer 160b formed on an upper side surface of the tempered substrate 160a and exposed to external light has a surface processed by an anti-reflect sputtering. That is, the anti-reflect layer 160b is formed as two materials having different refractivity are alternately formed on the tempered substrate 160a in 5 or 6 layers. For instance, a first layer firstly exposed to sunlight or an external lamp is formed of a material having a low refractivity, a second layer is formed of a material having a high refractivity, and a third layer is again formed of a material having a low refractivity. Under this configuration, light incident from outside gradually disappears while passing through each layer, thereby reducing a reflectivity. However, the anti-reflect layer 160a does not necessarily undergo a surface processing using an anti-reflect sputtering. Rather, various surface-processing methods such as an anti-reflect coating, or anti-contamination processing or an anti-fingerprint processing may be applied to the anti-reflect layer 160a.

The adhesive layer 160c formed on a lower side surface of the tempered substrate 160a and contacting the LC panel 150 is formed of a paste, etc. having a similar refractivity to the upper tempered substrate 160a, or the lower polarizer 151 in a UV or thermal hardening manner. Light incident to the anti-reflect layer 160b and passing through the tempered substrate 160a is made to be continuously absorbed into (or to pass through) the adhesive layer 160c and the polarizer 151 having a similar refractivity to the tempered substrate 160a. Accordingly, a total reflectivity to outside of the LC panel 150 is reduced to the maximum.

For example, if light passing through the anti-reflect layer 160b contacts air disposed at an air gap between the protection member 160 including the anti-reflect layer 160b and the LC panel 150, the light is outwardly reflected from an interface between the protection member 160 and the air gap, due to different refractivity between the tempered substrate 160a and the air. As a result, a total reflectivity to outside of the LC panel 150 increases.

To cope with this problem, the adhesive layer 160c on the protection member 160 is formed of a material having a similar refractivity to the tempered substrate 160a, and is formed of a material having a similar refractivity to the lower LC panel 150 or the polarizer 151 on the LC panel 150.

As the paste having a similar refractivity of 1.3~1.8 to the tempered substrate 160a or the polarizer 151, an optical elastic resin, SVR (super view resin) containing an acryl-based ultraviolet hardening type resin as a main component and made from Sony Corporation of Japan may be used. However, the paste of the present invention is not limited to the specific paste. Rather, any paste may be used as long as it is within the scope of the present invention, and a UV or thermal hardening process for facilitation is possible.

Here, the paste may additionally include at least one of a solvent, a plasticizer, and/or an interface activator. The paste enhances a bonding force between the tempered substrate 160a and the polarizer 151 on the LC panel 150. An amount of the paste may be varied to accelerate a UV or thermal hardening process.

The paste is disposed on a lower side surface of the tempered substrate 160a in the form of liquid, and the tempered substrate 160a having the paste thereunder is attached onto the polarizer 151 formed on one side surface of the LC panel 150. Then, the paste is hardened by undergoing UV irradiation from an upper side of the tempered substrate 160a, or heat supply from a lower side of the LC panel 150. As a result, the protection member 160 coupled to the LC panel 150 is formed.

Rather than the method that a paste formed on a lower side surface of the tempered substrate 160a is adhered onto the LC panel 150, other methods may be used. That is, a paste may be formed on the polarizer 151 on the LC panel 150, or may be directly formed on the LC panel 150 when the polarizer 151 is not implemented. Then, the tempered substrate 160a is attached onto the paste. Then, the paste may undergo UV irradiation from an upper side of the tempered substrate 160a, or heat supply from a lower side of the LC panel 150, thereby being hardened. Accordingly, the protection member 160 coupled to the LC panel 150 may be formed.

An upper cover 170 is coupled to the lower cover 100 with encompassing four edges of the protection member 160 on the LC panel 150, and side surfaces of the main support 145.

Referring to FIG. 5, light incident onto the protection member 160 from outside is firstly reflected at an interface thereof since a refractivity (n1) of air and a refractivity (n2) of the anti-reflect layer 160b of the protection member 160 are different from each other. Here, light passing through the anti-reflect layer 160b is outwardly diffused while passing through a plurality of layers that two different materials are alternately formed, thereby gradually disappearing. Then, the light passes through the tempered substrate 160a having a similar refractivity (n3) to the anti-reflect layer 160b, the adhesive layer 160c having a similar refractivity (n4) to the anti-reflect layer 160b, and the polarizer 151 on the LC panel 150, sequentially. Accordingly, the light is not reflected at each interface, thereby reducing a total reflectivity of light reflected to outside of the LC panel 150 or the protection member 160.

Here, when the tempered substrate 160a has a refractivity (n3) of 1.4~1.7, and the polarizer 151 has a refractivity (n5) of 1.4~1.6, the adhesive layer 160c has a refractivity (n4) of 1.3~1.8. Each refractivity of the tempered substrate 160a, the adhesive layer 160c, and the polarizer 151 is set so that the difference therebetween can not exceed '0.2'.

Accordingly, not only a surface reflectivity on the protection member 160, but also an interface reflectivity occurring from each medium can be reduced, thereby reducing the total reflectivity.

Hereinafter, a simulation relating to a reflectivity of an LCD device having the protection member 160 will be explained.

As experimental conditions, a 42-inch sized LCD device having 18 lamps was used, and a level of illumination was measurable up to 4000 lux.

Figure 6A:
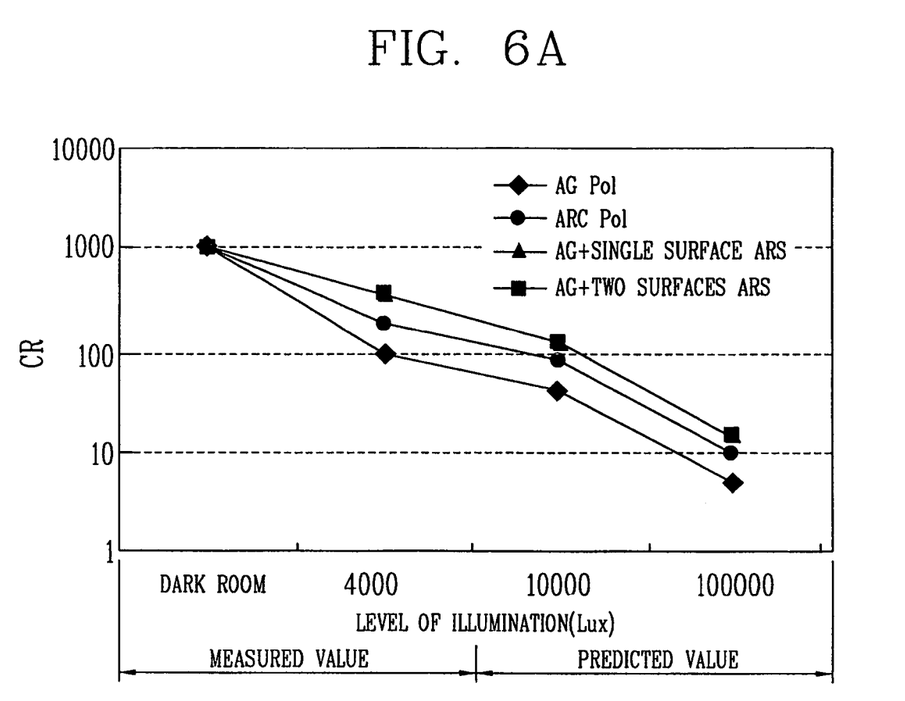
FIG. 6A is a graph showing a contrast ratio (CR) of the LCD device of FIGS. 3 and 4.
Figure 6B:
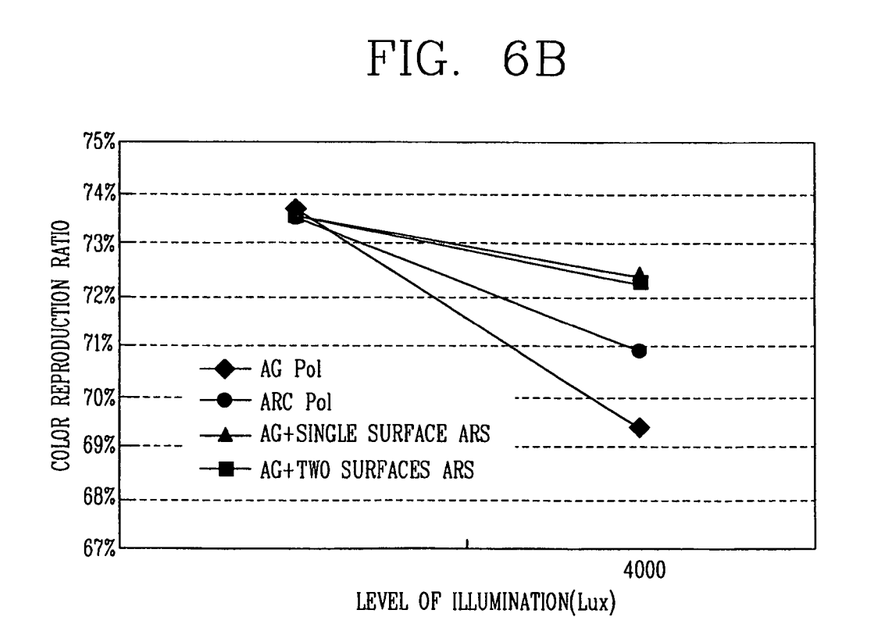
FIG. 6B is a graph showing a color reproduction ratio of the LCD device of FIGS. 3 and 4.

FIG. 6A is a graph showing a contrast ratio (CR) of the LCD device of FIGS. 3 and 4, and FIG. 6B is a graph showing a color reproduction ratio of the LCD device of FIGS. 3 and 4.

As shown in FIG. 6A, very similar contrast ratios (CR) were observed in an LCD device having a protection member and having an anti-reflect layer formed on an upper side surface of a tempered substrate by a sputtering process (AG+ single surface ARS), and an LCD device having an anti-reflect layer formed on upper and lower side surfaces of a tempered substrate by a sputtering process (AG+ two-surface ARS).

On the contrary, an LCD device (AG Pol) that a polarizer is attached onto an LC panel without an additional anti-reflect process (surface process), and an LCD device (ARC Pol) that an anti-reflect coating is performed on one side surface of the polarizer showed contrast ratios considerably different from each other based on 4000 lux.

More concretely, as shown in FIG. 6A, under an assumption that every contrast ratio (CR) of an LCD device is 1000:1 in a dark circumstance, an LCD device (AG+ single surface/two-surface ARS) shows a contrast ratio (CR) of about 600:1 in an illumination circumstance of 4000 lux. On the contrary, an LCD device (AG Pol) having a polarizer attached onto an LC panel without an additional anti-reflect process (surface process) shows a contrast ratio (CR) of about 100:1, and an LCD device (ARC Pol) that an anti-reflect coating is performed on one side surface of a polarizer shows a contrast ratio (CR) of about 300:1.

Through these measured values, prediction values may be obtained. For instance, if an LCD device completely exposed to sunlight in an outdoor environment has a level of illumination corresponding to 1000,000 lux, an LCD device exposed to sunlight in an indoor circumstance (semi-outdoor circumstance) has a level of illumination corresponding to about 10,000 lux. And, the brightest lamp among indoor lamps has a level of illumination corresponding to about 5,000 lux. FIG. 6A is a graph showing each contrast ratio (CR) according to different levels of illumination.

It can be observed that a contrast ratio (CR) is inversely proportional to a level of illumination on the basis of 4,000 lux.

Hereinafter, referring to FIG. 6B, a color reproduction ratio of an LCD device according to each level of illumination in the same condition as FIG. 6A will be explained.

Referring to FIG. 6B, under an assumption that all LCD devices show a color reproduction ratio of 73.4% in a dark room, an LCD device according to the present invention shows a color reproduction ratio of about 72.4% in a level of illumination of 4,000 lux. On the contrary, an LCD device (AG Pol) having a polarizer attached onto an LC panel without an additional anti-reflect process (surface process) shows a color reproduction ratio of about 69.1%, and an LCD device (ARC Pol) that an anti-reflect coating is performed on one side surface of a polarizer shows a color reproduction ratio of about 71%.

In the LCD device according to the present invention, when a protection member is provided on an LC panel, an anti-reflect layer is formed on the protection member exposed to external light, and an adhesive layer having a similar refractivity to the LC panel and the protection member is formed between the protection member and the LC panel. Accordingly, can be prevented a phenomenon that light incident onto the protection member is outwardly reflected due to different refractivity at each interface between components of the LCD device. As a result, a total reflectivity of light to outside of the LCD device is considerably decreased to enhance an outdoor visibility.

In the present invention, rather than the method for implementing the protection member by forming a paste in a UV or thermal hardening manner, other methods may be used. For example, an adhesive layer may be implemented as a double-sided tape, a sheet, or a plate. Here, the double-sided tape, the sheet, or the plate have to be formed of a material having a similar refractivity to the tempered substrate and the polarizer (or the LC panel when the polarizer is not implemented) without an air gap.

In the LCD device according to the first embodiment of the present invention, the protection member is provided on the LC panel, thereby enhancing an outdoor visibility against an external impact and/or external light. However, the LCD device according to the first embodiment of the present invention may have another problem due to its increased thickness. That is, light leakage may occur at edge regions of the LC panel having the protection member thereon due to internal light (or backlight light) provided from the backlight unit disposed below the LC panel.

In order to solve this problem, an LCD device according to a second embodiment of the present invention will be explained.

Figure 7:
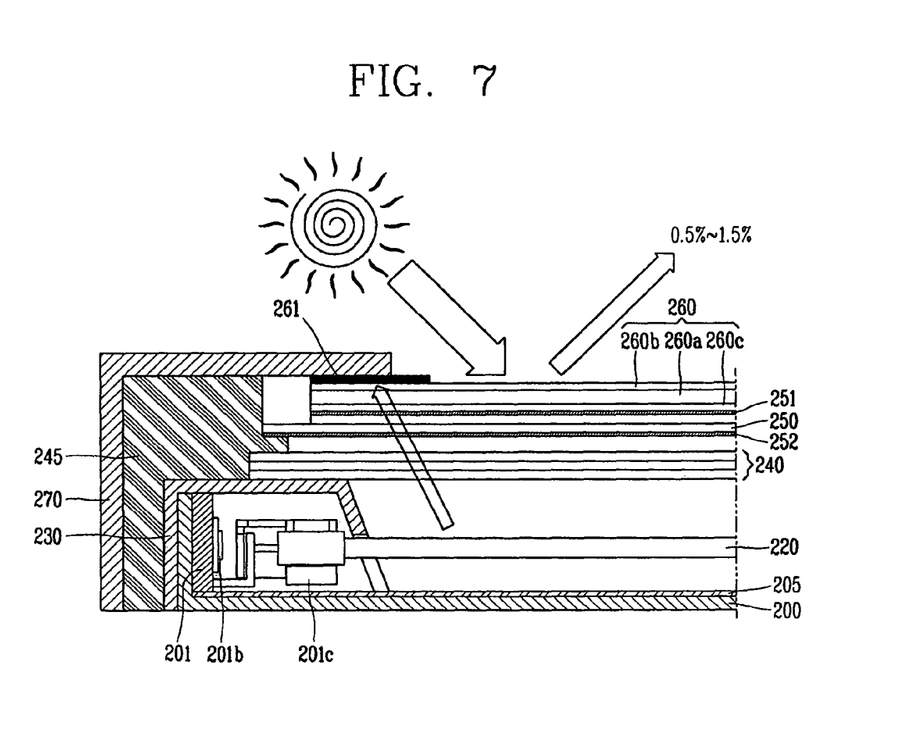
FIG. 7 is a partial sectional view of an LCD device according to a second embodiment of the present invention in contrast to FIG. 4.
Figure 8:
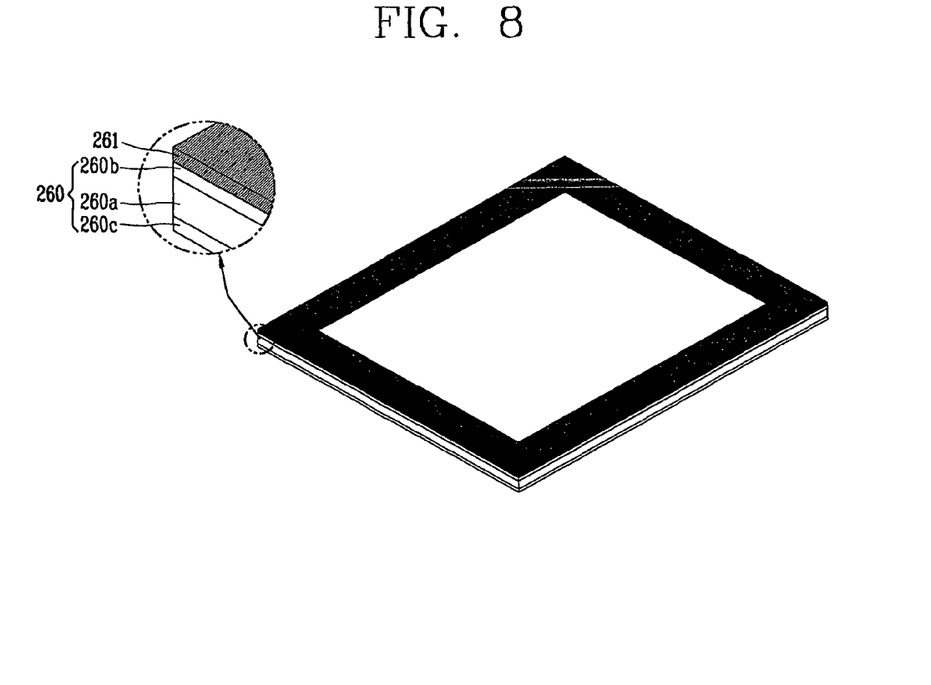
FIG. 8 is a perspective view of a protection member of FIG. 7.

FIG. 7 is a partial sectional view of an LCD device according to a second embodiment of the present invention in contrast to FIG. 4, and FIG. 8 is a perspective view of a protection member of FIG. 7.

Referring to FIGS. 7 and 8, the a liquid crystal display (LCD) device according to a second embodiment of the present invention comprises: a backlight unit (not shown) for providing light by receiving a voltage from outside; an LC panel 250 disposed above the backlight unit, and displaying images; and a protection member 260 consisting of a tempered substrate 260a formed on the LC panel 250 and protecting the LC panel 250 from an external impact, and an anti-reflect layer 260b formed on the tempered substrate 260a and reducing a reflectivity of external light, wherein the protection member 260 includes an adhesive layer 260c formed of a material having a similar refractivity to the tempered substrate 260a of the protection member 260, and adhering the protection member 260 onto the LC panel 250; and a light leakage preventing unit 261 formed at one or more edge regions of the anti-reflect layer 260b of the protection member 260.

More concretely, the protection member 260 may consist of a tempered substrate 260a for protecting the LC panel 250 from an external impact; an anti-reflect layer 260b formed on an upper side surface of the tempered substrate 260a to be outwardly exposed, and contacting external light; an adhesive layer 260c formed on a lower side surface of the tempered substrate 260a, and contacting the LC panel 250 or the polarizer 251 on the LC panel 250; and a light leakage preventing unit 261 formed at one or more edge regions of the anti-reflect layer 260b, and preventing leakage of light provided from the backlight unit disposed below the protection member 260.

Here, the tempered substrate 260a may be formed of a tempered glass having a thickness of about 2~5 mm so that the LC panel 250 therein can be protected from an external impact. The tempered glass is reinforced by compression-deforming a surface of a molded plate glass and tension-deforming inside thereof, in which the molded plate glass is heated to a temperature of 500°~600° C. close to a softening temperature, and then is drastically cooled by a compressed cooling air. The tempered substrate has a bending intensity corresponding to 3~5 times of a general glass, an impact endurance corresponding to 3~8 times of a general glass, and an excellent heat endurance. Since the tempered substrate maintains a balance of an entire force therein, even if one side of the tempered substrate is cut off, the entire part is cracked into pieces. Accordingly, it is required to form the tempered substrate in a shape suitable for the purpose before performing a tempered process.

The anti-reflect layer 260b formed on an upper side surface of the tempered substrate 260a and exposed to external light has a surface processed by an anti-reflect sputtering. That is, the anti-reflect layer 260b is formed as two materials having different refractivity are alternately formed on the tempered substrate 260a in 5 or 6 layers. For instance, a first layer firstly exposed to sunlight or an external lamp is formed of a material having a low refractivity, a second layer is formed of a material having a high refractivity, and a third layer is again formed of a material having a low refractivity. Under this configuration, light incident from outside gradually disappears while passing through each layer, thereby reducing a reflectivity. However, the anti-reflect layer 260a does not necessarily undergo a surface processing using a sputtering method. Rather, various methods such as an anti-reflect coating, or anti-contamination processing or an anti-fingerprint processing may be applied to the anti-reflect layer 160a.

The adhesive layer 260c formed on a lower side surface of the tempered substrate 260a and contacting the LC panel 250 is formed of a paste, etc. having a similar refractivity to the upper tempered substrate 260a, or the lower polarizer 251 in a UV or thermal hardening manner. Light incident to the anti-reflect layer 260b and passing through the tempered substrate 260a is made to be continuously absorbed into (or to pass through) the adhesive layer 260c and the polarizer 251 having a similar refractivity to the tempered substrate 260a. Accordingly, a total reflectivity to outside of the LC panel 250 is reduced to the maximum.

For example, if light passing through the anti-reflect layer 260b contacts air disposed at an air gap between the protection member 260 including the anti-reflect layer 260b and the LC panel 250, the light is outwardly reflected from an interface between the protection member 260 and the air gap, due to different refractivity between the tempered substrate 260a and the air. As a result, a total reflectivity to outside of the LC panel 250 increases.

To cope with this problem, the adhesive layer 260c on the protection member 260 is formed of a material having a similar refractivity to the tempered substrate 260a, and is formed of a material having a similar refractivity to the lower LC panel 250 or the polarizer 251 on the LC panel 250.

As the paste having a similar refractivity of 1.3~1.8 to the tempered substrate 260a or the polarizer 251, an optical elastic resin, SVR (super view resin) containing an acryl-based ultraviolet hardening type resin as a main component and made from Sony Corporation of Japan may be used. However, the paste of the present invention is not limited to the specific paste. Rather, any paste may be used as long as it is within the scope of the present invention, and a UV or thermal hardening process for facilitation is possible.

Here, the paste may additionally include at least one of a solvent, a plasticizer, and/or an interface activator. The paste enhances a bonding force between the tempered substrate 260a and the polarizer 251 on the LC panel 250. An amount of the paste may be varied to accelerate a UV or thermal hardening process.

The paste is disposed on a lower side surface of the tempered substrate 260a in the form of liquid, and the tempered substrate 260a having the paste thereunder is attached onto the polarizer 251 formed on one side surface of the LC panel 250. Then, the paste is hardened by undergoing UV irradiation from an upper side of the tempered substrate 260a, or heat supply from a lower side of the LC panel 150. As a result, the protection member 260 coupled to the LC panel 250 is formed.

Rather than the method that a paste formed on a lower side surface of the tempered substrate 260a is adhered onto the LC panel 250, other methods may be used. That is, a paste may be formed on the polarizer 251 on the LC panel 250, or may be directly formed on the LC panel 250 when the polarizer 251 is not implemented. Then, the tempered substrate 260a is attached onto the paste. Then, the paste undergoes UV irradiation from an upper side of the tempered substrate 260a, or heat supply from a lower side of the LC panel 250, thereby being hardened. Accordingly, the protection member 260 coupled to the LC panel 250 may be formed.

A light leakage preventing unit (or a light leakage preventing member) 261 is formed below one or more edge regions of the protection member 260, thereby preventing leakage of light provided to the LC panel 25. Here, the light leakage preventing unit 261 may be implemented as an additional sheet, or may be a resin based black matrix (BM) formed by a sputtering process or a photolithography process using a coating method in the same manner as a black matrix (BM) of a color filter substrate. The light leakage preventing unit 261 may be implemented as a metallic chrome oxide (CrOx) in one layer.

In the present invention, since lamps 220 serving as an optical source of the backlight unit are implemented as direct type lamps, the light leakage preventing unit 261 is formed at four edge regions of the protection member 260 (or at four edge regions of a sheet). However, if the lamps 220 serving as an optical source of the backlight unit are implemented as edge type lamps provided at one edge region, the light leakage preventing unit 261 on the protection member 260 has to be formed only at one edge region corresponding to the lamps 220. The position of the light leakage preventing unit 261 is not limited to a specific position.

When the LC panel 250 is divided into a first region for displaying images and a second region disposed at one side of the first region and displaying no image, the light leakage preventing unit 261 is preferably formed at the second region. Accordingly, the light leakage preventing unit 261 may be divided into a covered region covered with the upper cover 270 by contacting thereto, and an exposed region exposed to external light on the protection member 260.

In order to equally maintain a reflectivity of the light leakage preventing unit 261 exposed to external light to a total reflectivity of light reflected to the first region (image region) of the LC panel 250, the light leakage preventing unit 261 is formed of a material having a similar refractivity to the anti-reflect layer 260b of the protection member 260, the tempered glass 260a, and the adhesive layer 260c. Under this configuration, the light leakage preventing unit 261 has a reflectivity of 0.5~1.5%.

Except for the light leakage preventing unit 261, other components of the LCD device according to the second embodiment of the present invention, such as the lamps 220 and a balance PCB 201 of the backlight unit are similar to those of the LCD device according to the first embodiment of the present invention. Accordingly, explanation for the similar components will be omitted.

The LCD device according to the second embodiment of the present invention may have various modifications. For instance, as shown in FIG. 7, in order to maximize a function to prevent leakage of light provided from the backlight unit disposed below the LC panel 250, a second light leakage preventing unit may be further formed at an outer edge region between two substrates attached to each other, in correspondence to the aforementioned light leakage preventing unit 261.

Here, the second light leakage preventing unit may be formed to have the same or different width as/from that of the first light leakage preventing unit 261. However, it is preferable to form the second light leakage preventing unit with the same width as that of the first light leakage preventing unit 261, in which an interface between the first region for displaying images and the second region disposed at one or more sides of the first region in the first light leakage preventing unit 261 is consistent with an interface between a first region and a second region in the second light leakage preventing unit. That is, the second light leakage preventing unit is formed so that the first region that displays images can not be covered.

Although not shown, the present invention may be implemented as an LCD device capable of reducing a total reflectivity of external light at an image region of an LC panel, and preventing leakage of internal light provided therebelow.

For instance, in order to form a protection member, an adhesive layer is formed on a polarizer on an LC panel, an anti-reflect layer is formed on the adhesive layer by a coating method, etc., and a light leakage preventing unit for preventing leakage of light provided from a backlight unit is formed at one or more edge regions of the anti-reflect layer.

Accordingly, the protection member may consist of only an anti-reflect layer for reducing reflectivity of external light; an adhesive layer adhered to an LC panel without an air gap, and formed of a material having a similar refractivity as the LC panel and the anti-reflect layer, for passing through light absorbed through the anti-reflect layer; and a light leakage preventing unit formed at one or more edge regions of the anti-reflect layer, for preventing leakage of light provided from a backlight unit.

The present invention may have various modifications according to its purposes within the scope of the technical background. Scopes of preferred embodiments or integrated preferred embodiments according to the present invention will be explained in claims.

The LCD device according to the present invention enhances reliability by protecting the LC panel from an external impact, etc. Furthermore, the adhesive layer is formed of a material having a similar refractivity to the tempered substrate of the protection member and the LC panel, without an air gap from the tempered substrate and the LC panel. Accordingly, a total reflectivity of light to outside of the LC panel is lowered, thereby enhancing an outdoor visibility.

Furthermore, a light leakage phenomenon that light provided from the backlight unit disposed below the LC panel leaks at one or more edge regions of the LC panel having the protection member is prevented, thereby maintaining a uniform brightness of the LCD device.

The foregoing embodiments and advantages are merely exemplary and are not to be construed as limiting the present invention. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A liquid crystal display (LCD) device, comprising:
    an LC panel having a polarizer on at least an upper surface thereof, and displaying images;
    a lower cover under the LC panel;
    a backlight unit being disposed on the lower cover to provide light to the LC panel, the backlight unit including a balance PCB (Printed Circuit Board) disposed at inner sides of the lower cover to drive a plurality of lamps, a reflective layer attached on the lower cover, and a lamp socket mounted on the balance PCB to couple the lamps, the lamp socket being curved in the upper direction in a predetermined angle so that one end portion of the lamp socket is fixed at the balance PCB and another end portion couples the lamps;
    a protection member being provided on the polarizer, and being made of a tempered substrate for protecting the LC panel from an external impact and an anti-reflect layer reducing a reflectivity of external light by being formed on the tempered substrate; and
    an adhesive layer being formed from a material having a similar refractivity to the polarizer and the tempered substrate of the protection member, and adhering the protection member onto the LC panel by being interposed therebetween,
    wherein the differences of each refractivity between the tempered substrate and the adhesive layer and between the adhesive layer and the polarizer are set not to exceed 0.2,
    wherein the anti-reflect layer is formed on an upper side surface of the tempered substrate, a material having a low refractivity and a material having a high refractivity are alternately formed on the tempered substrate, the material having low refractivity being formed at an uppermost part of the anti-reflect layer so that external light is incident through the material having low refractivity,
    wherein the anti-reflect layer has a surface formed by an anti-reflect sputtering, wherein the balance PCB is vertically disposed on a bottom of the lower cover and a height of the balance PCB is variable so that a distance between the lamp and the reflective layer is controlled.

2. The LCD device of claim 1, wherein the tempered substrate has a refractivity of 1.4-1.7, the polarizer has a refractivity of 1.4-1.6, and the adhesive layer has a refractivity of 1.3-1.8.

3. The LCD device of claim 1, wherein the tempered substrate is implemented as tempered glass.

4. The LCD device of claim 1, wherein the adhesive layer includes at least one of a solvent, a plasticizer, and/or an interface activator.

5. The LCD device of claim 1, further comprising a light leakage preventing unit preventing leakage of light provided from the backlight unit by being formed at one or more edge regions of the protection member.

6. The LCD device of claim 5, wherein the LC panel is divided into a first region displaying images, and a second region displaying no images disposed at one or more sides of the first region,
    wherein the anti-reflect layer for reducing reflection of external light;
    wherein the adhesive layer is formed to be adhered onto the LC panel without an air gap, and formed of a material having a similar refractivity as the LC panel and the anti-reflect layer, for transmitting light transmitted through the anti-reflect layer and reduces a reflectivity of external light provided from outside in correspondence to the first region of the LC panel, and
    wherein the light leakage preventing unit prevents leakage of light provided from the backlight unit by being provided in correspondence to the second region of the LC panel.

7. The LCD device of claim 6, wherein the adhesive layer is formed on a lower surface of the protection member, and the light leakage preventing unit is formed in correspondence to the second region on an upper surface of the protection member.

8. The LCD device of claim 5, wherein the light leakage preventing unit is formed from at least one of a resin-based material and chrome oxide (CrOx).

9. The LCD device of claim 1, wherein the adhesive layer is formed by a UV or thermal hardening process.

* * * * *